FIG. I.

United States Patent Office 3,326,779
Patented June 20, 1967

3,326,779
LIQUID TRANSFER BETWEEN DROPS OF RELATIVELY DIFFERENT RADIUS OF CURVATURE
Franklin A. Rodgers, Arlington, Mass., assignor to Pactide Corporation, Cambridge, Mass., a corporation of Delaware
Filed Feb. 5, 1963, Ser. No. 256,371
14 Claims. (Cl. 203—10)

This invention relates to novel apparatus for transferring volatile liquid from one liquid body to another and useful in the recovery, separation and/or purification of liquids.

In the copending U.S. application of Purcell et al., Ser. No. 256,407, filed Feb. 5, 1963, there is described a liquid transfer method involving a liquid-vapor-liquid transition in which the energy input is in the form of mechanical energy expended to convert a liquid body, from which a volatile liquid is to be extracted, into an aerosol. The aerosol comprises droplets of liquid suspended in a carrier gas including the saturated vapor of the volatile liquid which is to be extracted from the liquid body and transferred to another body. Liquid extraction and transfer is effected by bringing the aerosol into intimate association with a reservoir of a liquid (e.g., the other liquid body) including the volatile liquid, the reservoir having a vapor pressure associated therewith which is lower than the vapor associated with the aerosol so that, in reducing the vapor pressure of the aerosol toward equilibrium with the reservoir, volatile liquid is transferred from the aerosol droplets to the reservoir.

Objects of the invention are: to provide novel and improved apparatus for transferring volatile liquid from one body of liquid to another by the method described and useful in the recovery, separation and/or purification of liquids; and to provide apparatus as described characterized by a construction which is relatively simple and inexpensive thereby representing a lower capital investment, requires a minimum energy commitment for its operation, is more efficient and produces a product at lower unit cost.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

Figure 1:
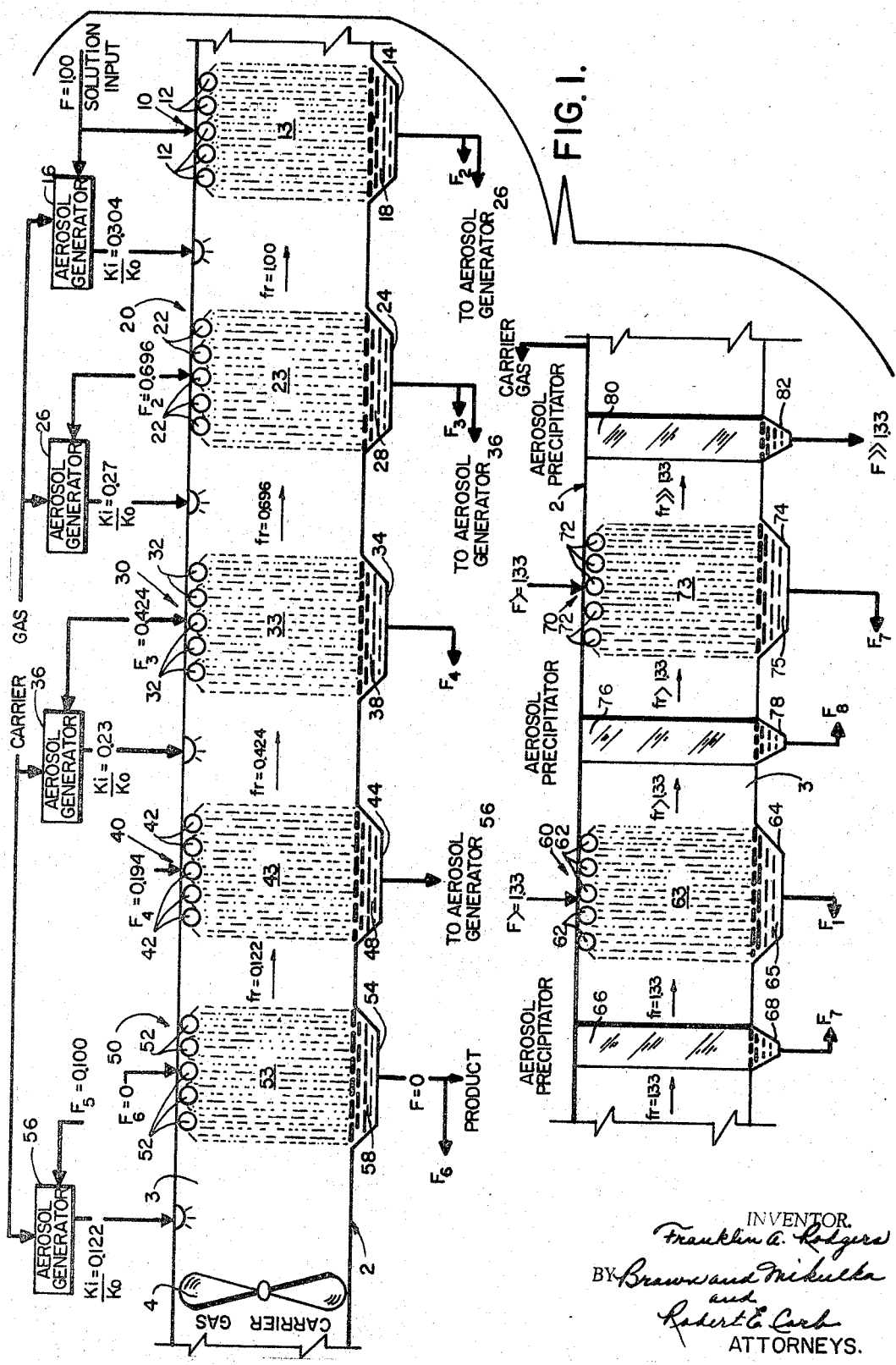
Figure 2:
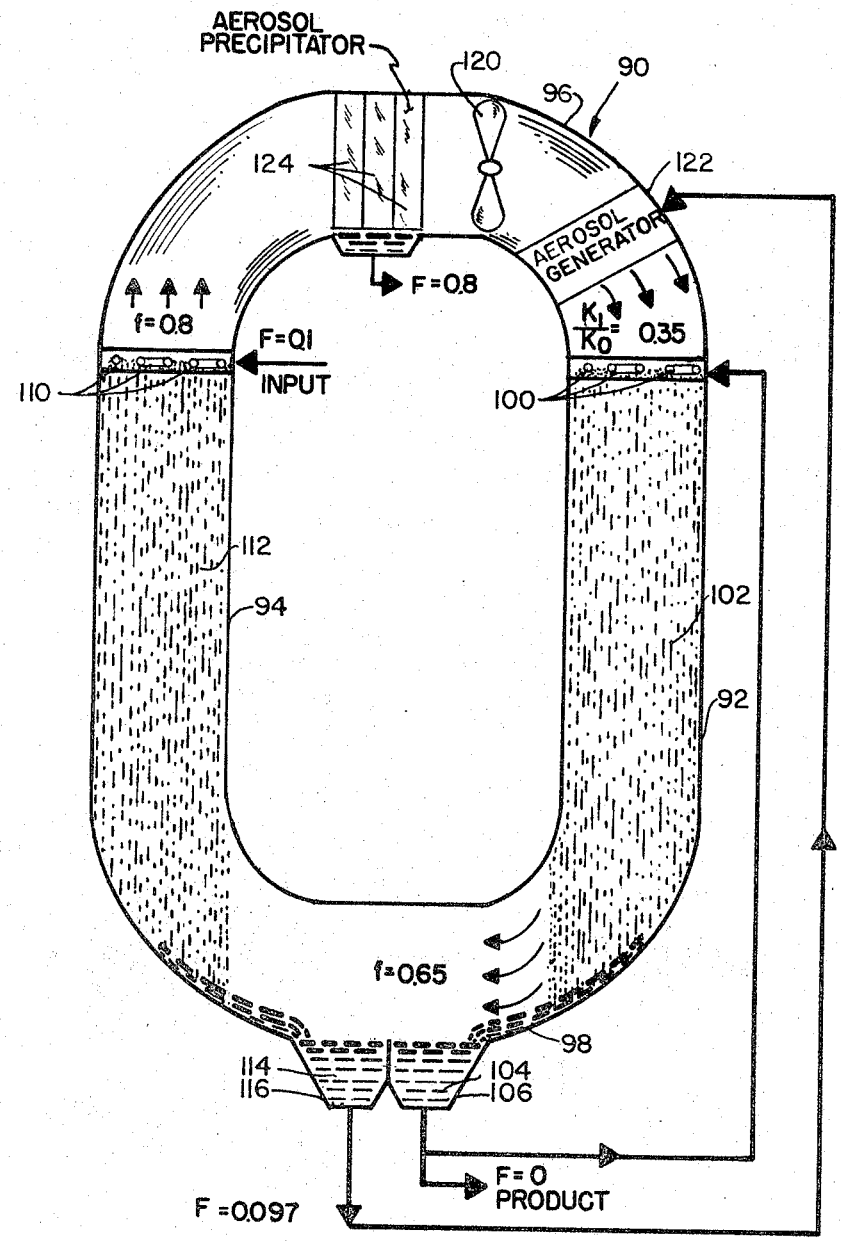

For a fuller understanding of the nature and objects of the invention, reference should be had to the following detailed description taken in connection with the accompanying drawings wherein:

FIGURE 1 is a somewhat schematic, elevational view showing, in section, apparatus embodying the invention; and FIGURE 2 is a view similar to FIGURE 1 of another embodiment of the apparatus.

The method described in the aforementioned application is useful for transferring any volatile liquid from one liquid body to another liquid body including the volatile liquid, and the liquid body from which the volatile liquid is transferred comprises a substance, in addition to the volatile liquid, which tends to depress its vapor pressure; and accordingly such liquid bodies may include solutions, emissions, dispersions and combinations thereof. The expression "volatile liquid" is employed herein in its broadest sense to mean and include any liquid having a significant vapor pressure. While the process finds a large number of applications, it has been discussed previously and will be considered herein with special regard to the purification and desalination of water, and with particular references to sea water considered as comprising 3.5% salt.

The method involves the conversion of a solution, e.g., sea water or water of a lesser salinity, into an aerosol comprising droplets of the solution suspended in a carrier gas including or consisting of saturated water vapor. The solute concentration of a body of liquid, whether it be make-up water for the aerosol or some other body, relative to the solute concentration of a reference solution (in this case sea water), is designated "F" in the drawings and in the discussion thereof. The relative solute concentrations of aerosol droplets shall be designated "$f$" to distinguish from the relative solute concentration of bulk liquids. Conventional systems may be employed to generate an aerosol of the desired droplet size and include systems in which a liquid is expelled under pressure through a nozzle or aspirators in which the carrier gas is propelled in such a way as to break up a liquid stream into fine droplets. The energy required to achieve the liquid transfer is thus imparted to the solution (e.g., sea water) in order to transform the solution into aerosol droplets and is stored in the droplets as surface energy. The droplet size is expressed herein, in terms of droplet curvature "$K$" which is the reciprocal of the radius of the droplet, as $K_1/K_0$ in which $K_1$ is the curvature of the droplet at unity relative solute concentration and $K_0$ is a factor characterizing the particular solution and introduced to render the relationships illustrated herein universally applicable to solutions. For sea water (3.5% salt) at ordinary temperatures, the value of $K_0$ is of the order of 50 reciprocal microns.

The liquid transfer method is based on the fact that the equilibrium vapor pressure of a volatile liquid is dependent, among other factors, upon the radius of curvature of the liquid-vapor interface according to the expression $$\frac{(\Delta P)_k}{P_0} \simeq \frac{2M\gamma K}{RTe}$$

and the equilibrium vapor pressure of a droplet of a solution is depressed linearly with solute (nonvolatile or less volatile) concentration according to the expression $$\frac{(\Delta P)_s}{P_0} = -\alpha C_o \left(\frac{K}{K_i}\right)^3$$

in which $(\Delta P)_s$ is the equilibrium vapor pressure charge due to solute of initial concentration $C_i$ and initial droplet curvature $K_i$. This expression constitutes a restatement in terms of droplet curvature of the well-known depressing effect of a solute on the vapor pressure of a volatile liquid. If the initial solute concentration is sufficiently high and the initial curvature is sufficiently low, the cubic dependence of this expression will control so that when a droplet suspended in a carrier gas comprising the saturated vapor of the solvent is brought into association with a reservoir of liquid including the solvent and having an associated vapor pressure which is lower than the vapor pressure associated with the droplet, solvent will transfer from the droplet to the reservoir reducing the vapor pressure of the droplet toward equilibrium with the reservoir.

The basic components of the apparatus of the invention are a reaction vessel for containing a reservoir of liquid, an aerosol generator and means for bringing the aerosol into association with the reservoir to transfer liquid from the aerosol to the reservoir and then separate the aerosol from the reservoir. Such an apparatus would include a liquid transfer stage or zone at which the aerosol is brought into association wtih the reservoir to reduce the vapor pressure of the aerosol toward equilibrium with the reservoir. It has been found that the amount of solvent transferred from a droplet of a given size is influenced by the difference between the bulk relative solute concentration "F" of the aerosol make-up and that of the product reservoir with large differences tending to increase the amount of liquid transferred due to increased discrepancy between the vapor pressure associated with the aerosol and the vapor pressure associated with the reservoir. However, operation of a liquid transfer system in which the difference between bulk relative solute concentration of aerosol make-up and that of the product reservoir is of the order of magnitude involved, for example, in the single stage desalination of sea water would require the generation of aerosol droplets having a curvature so great as to be difficult and probably economically unfeasible. For this reason, it will often be more practical and desirable to provide liquid transfer apparatus provided for a plurality of liquid transfer stages in each of which the difference in bulk relative solute concentration is substantially less than unity.

The present invention is embodied in novel and improved apparatus for bringing an aerosol into intimate association with a reservoir to which liquid is to be transferred and then separating the aerosol from the liquid of the reservoir, and particularly, apparatus including a plurality of liquid transfer stages at each of which the aerosol and liquid are brought together. A typical multistage liquid transfer apparatus for converting sea water (3.5% salt) into fresh water ($F=0$) is illustrated in FIGURE 1 of the drawings. This apparatus includes five liquid transfer stages or zones for extracting salt water from sea water and contributing to the production of pure water as a product; and two additional liquid transfer stages for extracting additional fresh water from the aerosol following water extraction at the five previous stages, and producing, as a product, salt water with a salt concentration of the order of sea water ($K=1$). These latter two additional liquid transfer stages may prove economically feasible in instances in which the initial sea water input requires costly or extensive preparation such as filtration, transportation and the like; and would have particular application when a primary or secondary product of the system is a concentrated solution as when solute recovery is a motivating or controlling factor, or when brine disposal is a problem as in the treatment of brackish water. In the five initial liquid transfer stages (the product of which is fresh water), the product of every stage but one is a solution having a relative solute concentration "F" greater than the product of another stage at which the product is reintroduced into the system as part of the aerosol and as the reservoir thereof.

The apparatus shown in FIGURE 1 is designed to provide for substantial flexibility with regard to the choice of aerosol droplet size, relative salinity of the reservoirs and aerosol make-up water and the number and types of liquid exchange stages; and provides for greater efficiency with respect to liquid transfer, that is, intermingling of the aerosols and reservoirs and subsequent separation thereof. The apparatus comprises a single elongated reaction vessel 2 providing an elongated and preferably endless reaction chamber 3 in which liquid transfer occurs. Reaction vessel 2 is shown as two straight sections for purposes of illustration, it being understood that the ends of the vessel in the preferred embodiment would be connected to provide a continuous or endless reaction chamber. The reaction chamber thus formed may be of any desired or convenient configuration such as, circular, ellipsoidal or the like; or may include straight sections joined by connecting sections or even two or more multistage liquid exchange systems in the same endless reaction chamber. The transverse cross sectional configuration of the reaction chamber is not critical and may take any one of several convenient forms including, for example, circular, rectangular, ellipsoidal or a combination of such forms.

Each of the liquid transfer stages or zones includes means for producing a shower comprising moving drops of liquid constituting the reservoir to which liquid is transferred from the aerosol; and means for collecting the water comprising the shower. The drops comprising each shower may move in any direction (or combination of directions), and in the apparatus shown, simply fall under the force of gravity. At each stage, the means for producing the shower is located in the upper portion of the reaction chamber and comprise a conventional shower or spray nozzle or nozzles directed downwardly and so constructed and arranged as to provide a shower which substantially completely blocks a section of the chamber so that any gas and/or aerosol moving lengthwise of the chamber is required to pass through the shower. In another embodiment, for example, the shower may be in the form of a fountain in which the drops are expelled upwardly and thereafter fall. The seven liquid transfer stages shown are generally designated 10, 20, 30, 40, 50, 60 and 70 and each includes a spray device (of a conventional type) designated, respectively, 12, 22, 32, 42, 52, 62 and 72. The showers themselves are designated, respectively, 13, 23, 33, 43, 53, 63 and 73 and the means for collecting each shower comprise, respectively, receptacles or sumps designated, respectively, 14, 24, 34, 44, 54, 64 and 74, each being located in a lower portion of the reaction chamber underlying the spray device comprising the respective reaction stage.

Carrier gas and aerosol movement within the reaction chamber 3 are unidirectional, substantially horizontal and from left to right, viewing FIGURE 1, so that an aerosol introduced near the left end of chamber 3 adjacent liquid transfer stage 50 passes, in order, through shower 53, 43, 33, 23, 13, 63 and 73. Propellent means in the form of a fan or propeller 4 are provided within the reaction chamber for causing the carrier gas and/or aerosol comprising the atmosphere of the reaction chamber to move as described within the reaction chamber through the showers comprising the liquid transfer stages.

The apparatus includes a plurality of aerosol generators designated 16, 26, 36 and 56 for producing aerosols comprising droplets of predetermined relative salinities and curvatures and introducing the aerosols into the reaction chamber immediately before liquid transfer stages 10, 20, 30 and 50 respectively. Each of the aerosol generators is of a conventional type and while being shown as located exterior of the reaction chamber may, in practice, be included, at least in part, within the reaction chamber itself. Such aerosol generators may include spray nozzles, aspirators and the like, together with the associated pumps, compressors, conduits, etc., necessary, for example, for handling and expelling water and/or the carrier gas under pressure.

The reaction chamber is charged with an atmosphere comprising a carrier gas for the aerosol droplets. This carrier gas includes the saturated vapor of the liquid (water) being transferred, either exclusively or together with another gas, the nature and composition of which is dependent upon the nature and composition of the liquids involved. The carrier gas within the reaction chamber may be generated or formed either within the reaction chamber itself or exterior thereof (as indicated in the drawings) by conventional means. For example, the carrier gas may consist of saturated water vapor which could be formed by evacuating substantially all of the gas except water vapor from the reaction chamber and introducing water into the reaction chamber so that it vaporizes therein. In this regard, the reaction chamber may be maintained at ambient pressure, i.e., atmospheric or at a higher or lower pressure, as desired, the choice again being dependent upon the nature and composition of the liquids involved.

The apparatus is initially charged with quantities of liquids at various solute concentrations as shown, for example, in FIGURE 1 in which receptacles 14, 24, 34, 44 and 54 are initially provided with quantities of liquids designated with reference numerals and having relative solute concentrations "F" as follows:

| Receptacle | Liquid | |
|---|---|---|
| 14 | 18 | $F_2 = 0.696$ |
| 24 | 28 | $F_3 = 0.424$ |
| 34 | 38 | $F_4 = 0.194$ |
| 44 | 48 | $F_5 = 0.100$ |
| 54 | 58 | $F_6 = 0$ |

In the operation of the apparatus, liquid 18 is withdrawn from receptacle 14 to provide the make-up water for aerosol generator 26 and shower 23; liquid 28 is withdrawn from receptacle 24 to provide make-up water for aerosol generator 36 and shower 33; liquid 38 is withdrawn from receptacle 34 to provide shower 43; liquid 48 is withdrawn from receptacle 44 to provide shower 53 and the make-up water from aerosol generator 56; and liquid 58 is withdrawn from receptacle 54 and is recirculated to provide shower 53 in addition to providing the fresh water product ($F_6=0$) of the apparatus. The water for shower 13 and the makeup water for aerosol generator 16 constitute the input solution i.e., ea water at unit relative solute concentration ($F_1=1.00$).

The aerosol produced by generator 56 is generated at a droplet size $$\frac{K_i}{K_0} = 0.122$$

and introduced in advance of shower 53 so that the aerosol passes through the five showers comprising transfer stages 10, 20, 30, 40 and 50. During passage of the aerosol through shower 53, water is transferred from the aerosol to the drops comprising the shower thereby increasing relative solute concentration $f_r$ of the aerosol droplets from 0.100 to 0.122 and additional water is transferred from the aerosol during passage through shower 53 increasing the curvature of the droplets (i.e., reducing size) to 0.223. The aerosol produced by generator 36 is characterized by droplets of approximately the same curvature and relative solute concentration as the initial aerosol after passage thereof through showers 53 and 43 and is mixed with this resultant aerosol. This resultant aerosol is passed in turn through showers 33, 23 and 13 each time being increased in solute concentration and curvature, while the aerosols produced by generators 26 and 16 match as closely as possible the resultant aerosols with which they are mixed following passage of the resultant aerosols through showers 33 and 23. By virtue of this arrangement, the difference in relative solute concentration of each aerosol and the shower through which it passes is relatively small, it being realized that the relative solute concentrations of the showers and aerosols vary from location to location within each reaction zone or shower and that the relative solute concentrations given represent an average concentration for the liquid within a particular zone. For example, the drops comprising a shower decrease in solute concentration and increase in size as they fall through the aerosol from top to bottom of the reaction chamber; thus the drops comprising shower 13 decrease in relative solute concentration from 1.00 to 0.696 and in shower 23 from 0.696 to 0.424. The only shower in which the solute concentation remains constant is shower 53 in which water is transferred from the aerosol to a pure water shower.

The resultant aerosol emerging from shower 13, i.e., the fifth liquid transfer stage, has a relative solute concentration "$f_r$" equal to 1.33, that is, greater than the initial sea water input. The next two additional stages designated 60 and 70 include means for extracting additional water from the aerosol and providing this additional water at a solute concentration equal to that of sea water to provide additional input solution for aerosol generator 16 and shower 13. The first additional stage 60 includes an aerosol precipitator including, for example, charged collector plates 66 and a receptacle 68 in a lower section of the reaction chamber for collecting water at a relative salinity "$F_7$" equal to 1.33. Collector plates 66 are mounted in a portion of the reaction chamber so as to precipitate a fraction of the aerosol passing through the reaction chamber, and this liquid is conducted to spray device 62 to provide shower 63. The remaining aerosol at a relative salinity of 1.33 is passed through shower 63 to which liquid is transferred from the aerosol to reduce the relative solute concentration of the liquid comprising the shower from 1.33 to 1.00. This last-mentioned liquid, designated 65, is collected in receptacle 64 and is fed to aerosol generator 16 and shower device 12.

A second aerosol generator comprising charged collector plates 76 and a receptacle 78 is provided between showers 63 and 73 for precipitating a portion of the aerosol at a relative salinity greater than 1.33 and feeding this liquid to spray device 72 to provide shower 73. As the aerosol passes through shower 73, additional liquid is transferred to the shower drops reducing the relative solute concentration of liquid 75 collected in receptacle 74 to 1.33 so that liquid 75 may be fed to spray device 62 to provide shower 63.

The spent aerosol, after passing through the seven liquid transfer stages previously described, has a relative solute concentration considerably in excess of 1.33 and is passed through a third aerosol precipitator comprising charged collector plates 80 and a receptacle 82 which remove and collect all of the aerosol remaining suspended in the carrier gas so that the (now liquid-free) carrier gas including the saturated vapor (water) may be recirculated through the liquid chamber and/or introduced into the aerosol generators. The liquid collected in receptacle 82 has a relative solute concentration well in excess of 1.33 and constitutes a secondary product of the system, in this case, a highly concentrated salt solution.

The apparatus shown in FIGURE 1 comprises a large number (7) of liquid exchange stages in which an aerosol is passed into a substantially horizontal direction through a reservoir comprising shower or rain drops falling under the force of gravity in a substantially vertical direction for producing fresh water from sea water and extracting a maximum amount of water from the aerosol. A simpler two-stage liquid transfer apparatus is shown in FIG. 2 in which two reservoirs are provided comprising shower or rain drops falling vertically, and the aerosol is passed vertically, rather than horizontally, through the showers. The apparatus shown in FIG. 2 is designed to efficiently extract a high percentage of fresh water from backish water, that is, water having a salt concentration relative to sea water of the order of 0.1, i.e., 3,500 p.p.m. of salt rather than 35,000 p.p.m. Because the relative salt concentration of brackish water is of the order of a tenth of that of sea water, it is both efficient and economically feasible to produce fresh water with two (or even 1) liquid exchange stages since the salinity difference between the reservoir and aerosol at each exchange stage, is at most, relatively small.

The apparatus of FIG. 2 comprises a reaction vessel 90 in the form of a closed loop having two vertical sections 92 and 94 connected at their upper and lower ends by "C" shaped sections 96 and 98 providing an endless "O" shaped reaction chamber. Flow of the aerosol and/or carrier gas through the reaction chamber is in a clockwise direction i.e., downwardly through section 92, to the left through section 98, upwardly through section 94 and to the right within section 96, and movement of the aerosol and/or carrier gas is effected by such means as a fan or propeller 120 located within the right hand portion of upper section 96.

The apparatus includes two liquid transfer stages located within sections 92 and 94 and comprising respectively shower devices 100 and 110 mounted respectively in the upper portions of sections 92 and 94 for producing showers 102 and 112 which fall within sections 92 and 94. The liquids comprising showers 102 and 112 and designated respectively 104 and 114, are collected in receptacles designated 106 and 116 in lower section 98.

An aerosol generator 122 is provided in the right hand portion of upper section 96 between fan 120 and shower devices 100 for introducing an aerosol into the reaction chamber for passage downwardly through shower 102 and thence upwardly through shower 112. In the operation of the apparatus, receptacles 106 and 116 are charged with liquids 104 and 114 at relative salinities, respectively, of $F=0$ and $F=0.097$. The make-up water for the aerosol generator is liquid 114 withdrawn from receptacle 116, and the liquid for shower 102 is a portion of the fresh water product comprising liquid 104 withdrawn from receptacle 106. The liquid for shower 112 is the initial brackish water input at a relative salinity "F" equal to 0.1. The aerosol is generated at a curvature $$\frac{K_i}{K_0}=0.35$$

and a relative salinity "f" equal to 0.097, and is passed downwardly through shower 102 where water is transferred from the aerosol droplets to the shower increasing the relative solute concentration "f" of the aerosol to 0.65. The aerosol then passes upwardly through shower 112 where additional water is transferred to the shower drops increasing the relative solute concentration "f" of the aerosol to 0.8. The spent aerosol from the second stage shower 112 is then precipitated by a precipitator comprising charged collector plates 124 and a receptacle 126 located in upper section 96 of vessel 90. This precipitator removes substantially all of the aerosol droplets remaining suspended in the carrier gas which is recirculated through aerosol generator 122 and the reaction chamber. The liquid precipitated from the spent aerosol comprises a saline solution at a relative concentration "f" of 0.8, thus making it apparent that the present system in two liquid transfer stages removes 87½% of the water from the initial brackish water input thereby representing a high percentage recovery for the system.

Although the liquid transfer apparatus for desalinating brackish water is shown in FIG. 2 as comprising two liquid transfer stages in which both the aerosol and the shower drops move in vertical directions within vertical sections of a generally "O" shaped reaction vessel, it should be understood that the two-stage purification of brackish water could be accomplished equally well in apparatus of the type shown in FIGURE 1 in which the aerosol is passed horizontally rather than vertically through the showers. Alternatively, the provision of three or more of liquid exchange stages in apparatus of the type shown in FIG. 2 is possible, in which case the reaction vessel and chamber provided thereby would have a generally sinusoidal configuration in which the showers would be produced in vertical sections of the vertical sections of reaction chamber connected by alternating upper and lower "C" shaped connecting sections with the lower sections including means for collecting the liquid of the showers. The last vertical section or liquid transfer stage might then be connected to the first vertical section including the first liquid transfer stage to provide for recirculation of the carrier gas.

Regardless of the particular type of configuration of the apparatus, in each multistage apparatus the product of one stage is collected and introduced as the aerosol for a previous stage and a portion of the final product (i.e., fresh water) is recirculated to provide the shower for the stage in which the final product is produced. Intimate association of the aerosol and the reservoirs to which liquid is transferred (from the aerosol) is achieved by providing reservoirs of fine drops or droplets of a size which exceeds the maximum aerosol droplet size and is only large enough to insure that the shower or rain drops will fall under the force of gravity and will not become suspended within the carrier gas. In other words, the shower drop size is as small as possible while being sufficient to insure separation of the aerosol and shower droplets. The dimensions of each shower are selected to provide for an aerosol transit time (through the shower) which will enable a maximum transfer of liquid with a minimum of diffusion of solution i.e., aerosol droplets into the rain droplets; in turn providing for a resultant product of predetermined relative solute concentration from each stage. By virtue of the construction shown, it is possible to achieve high percentage solvent recovery with low solution diffusion and with easy and efficient separation of the aerosol from the reservoir showers together with the unidirectional movement of the carrier gas and aerosol.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. A liquid transfer method comprising:
generating a carrier gas including the saturated vapor of a liquid having a significant vapor pressure;
generating an aerosol comprising fine particles of a solution including said liquid as the solvent suspended in said carrier gas, said particles being formed with a curvature such that said particles and said carrier gas are in substantial equilibrium and the net transfer of said liquid between said particles and said carrier gas is substantially zero;
forming a shower of drops of a second liquid including the first-mentioned liquid, said drops being formed with an associated vapor pressure and a curvature substantially smaller than the associated vapor pressure and curvature of said aerosol particles such that an unstable condition exists when said aerosol is brought into association with said drops causing said first-mentioned liquid to transfer from said aerosol particles to said shower drops by way of said carrier gas to bring said particles, carrier gas and shower drops into equilibrium; and
passing said aerosol completely through said shower to effect liquid transfer from said aerosol particles to said shower drops until said particles, carrier gas and drops are substantially closer to equilibrium.

2. A liquid transfer method as defined in claim 1 wherein said shower drops are allowed to fall under the force of gravity and said aerosol is circulated through said shower in a generally horizontal direction.

3. A liquid transfer method as defined in claim 1 wherein said shower drops are allowed to fall under the force of gravity and said aerosol is circulated through said shower in a generally vertical direction.

4. A liquid transfer method as defined in claim 1 comprising:
forming a second shower from a solution including said liquid as the solvent and having a higher solute concentration than said first shower;
passing said aerosol through said second shower following passage of said aerosol through said first shower;
collecting the liquid comprising said second shower augmented by said liquid transferred to said second shower from said aerosol; and
forming said first shower with liquid collected from said second shower.

5. Apparatus for transferring a volatile liquid from one liquid body to another, said apparatus comprising, in combination:
means providing a reaction chamber;
means within said reaction chamber for producing a shower comprising moving drops of liquid from said other liquid body;

means for producing a saturated vapor of said volatile liquid and forming a carrier gas including said saturated vapor;

means for generating an aerosol comprising droplets of liquid from said one liquid body at a greater associated vapor pressure and curvature than the associated vapor pressure and curvature of said shower drops suspended in said carrier gas and introducing said aerosol into said reaction chamber;

propellant means for passing said aerosol completely through said shower to transfer said volatile liquid from said aerosol droplets to said shower drops and bring said aerosol droplets, carrier gas and shower drops substantially closer to equilibrium; and means within said reaction chamber for collecting the liquid comprising said shower augmented by said volatile liquid transferred thereto during passage of said aerosol through said shower.

6. The apparatus of claim 2 in which said propellant means cause said aerosol to pass through said shower in a direction transversely of the direction of movement of the said drops comprising said shower.

7. The apparatus of claim 2 in which said propellant means cause said aerosol to pass through said shower substantially in the direction of movement of said drops comprising said shower.

8. The apparatus of claim 2 in which said propellant means cause said aerosol to pass through said shower in a direction opposite to the direction of movement of said drops comprising said shower.

9. The apparatus of claim 2 in which said reaction chamber is endless.

10. The apparatus of claim 9 in which means are provided in the path of movement of said aerosol between said shower and the position at which said aerosol is introduced into said chamber for removing substantially all of said aerosol droplets from said carrier gas.

11. The apparatus of claim 2 in which there are provided:

means for producing at least a second shower, comprising drops of a liquid from a third liquid body, within said reaction chamber in the path of movement of said aerosol;

said propellant means circulate said aerosol in sequence completely through the first-mentioned and said second showers to transfer said volatile liquid from said aerosol droplets to said second shower; and means within said reaction chamber for collecting the liquid comprising said second shower augmented by said volatile liquid transferred thereto during passage of said aerosol through said second shower and introducing the last-mentioned liquid into said third liquid body.

12. The apparatus of claim 10 in which said reaction chamber is endless and includes first and second connected sections oriented to cause said aerosol to move vertically in opposite directions within said first and second sections, said means for producing said first shower are located within said first section and said means for producing said second shower are located within said second section.

13. The apparatus of claim 2 in which there are provided:

means positioned in the path of movement of said aerosol within said reaction chamber for removing a fraction of said aerosol droplets from said carrier gas and collecting the liquid comprising the last-mentioned droplets after said aerosol has passed through the first-mentioned shower;

means for producing a second shower, comprising drops of said last-mentioned liquid at a smaller associated vapor pressure and curvature than the associated vapor pressure and curvature of said aerosol droplets following passage thereof through said first-mentioned shower, within said reaction chamber in the path of movement of said aerosol;

said propellant means being adapted to propel said aerosol in sequence completely through said first-mentioned and second showers to transfer said volatile liquid from said aerosol droplets to said second shower; and means within said reaction chamber for collecting the liquid comprising said second shower augmented by said volatile liquid transferred thereto during passage of said aerosol through said second shower.

14. The apparatus of claim 2 in which means are provided for maintaining said reaction chamber at a pressure different from the ambient pressure.

References Cited

UNITED STATES PATENTS

| | | | |
|---|---|---|---|
| 1,779,536 | 10/1930 | Goodell | 159—4 |
| 1,859,770 | 5/1932 | Fleisher | 159—45 X |
| 2,056,266 | 10/1936 | Goodell | 159—4 |
| 2,145,109 | 1/1939 | Delisle | 159—4 X |
| 2,839,122 | 6/1958 | Laguilharre | 159—4 |
| 3,206,379 | 9/1965 | Hill | 202—236 |

FOREIGN PATENTS

| | | |
|---|---|---|
| 483,392 | 9/1929 | Germany. |

NORMAN YUDKOFF, *Primary Examiner.*

UNITED STATES PATENT OFFICE
CERTIFICATE OF CORRECTION

Patent No. 3,326,779                                        June 20, 1967

Franklin A. Rodgers

It is hereby certified that error appears in the above numbered patent requiring correction and that the said Letters Patent should read as corrected below.

Column 1, line 66, for "emmissions" read -- emulsions --; column 2, line 1, for "references" read -- reference --; lines 45 and 46, the equation should appear as shown below instead of as in the patent:

$$\frac{(\Delta P)s}{P_0} = -2Ci \left(\frac{K}{Ki}\right)^3$$

line 48, for "charge" read -- change --; column 4, line 33, for "shower" read -- showers --; column 5, line 20, for "from" read -- for --; line 25, for "ea" read -- sea --; same line 25, for "unit" read -- unity --; column 6, line 32, for "(now liquid-free )" read -- (now liquid-free) --; line 41, for "into" read -- in --; line 51, for "backish" read -- brackish --; column 9, lines, 19, 23, 27, 31 and 38, for the claim reference numeral "2", each occurrence, read -- 5 --; column 10, line 3, for the claim reference numeral "10" read -- 11 --; lines 11 and 35, for the claim reference numeral "2", each occurrence, read -- 5 --.

Signed and sealed this 25th day of June 1968.

(SEAL)
Attest:

EDWARD M. FLETCHER, JR.                            EDWARD J. BRENNER
Attesting Officer                                           Commissioner of Patents